United States Patent
Lin et al.

(10) Patent No.: US 11,844,058 B2
(45) Date of Patent: Dec. 12, 2023

(54) APPARATUS AND METHOD OF WIRELESS COMMUNICATION OF SAME

(71) Applicant: GUANGDONG OPPO MOBILE TELECOMMUNICATIONS CORP., LTD., Guangdong (CN)

(72) Inventors: Huei-Ming Lin, South Yarra (AU); Zhenshan Zhao, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/463,363

(22) Filed: Aug. 31, 2021

(65) Prior Publication Data
US 2021/0392654 A1    Dec. 16, 2021

Related U.S. Application Data

(63) Continuation of application No. 16/950,840, filed on Nov. 17, 2020, now Pat. No. 11,147,084, which is a continuation of application No. PCT/CN2019/095584, filed on Jul. 11, 2019.

(60) Provisional application No. 62/696,589, filed on Jul. 11, 2018.

(51) Int. Cl.
| H04W 72/12 | (2023.01) |
| H04W 76/14 | (2018.01) |
| H04W 76/27 | (2018.01) |
| H04W 72/0453 | (2023.01) |

(52) U.S. Cl.
CPC ....... *H04W 72/12* (2013.01); *H04W 72/0453* (2013.01); *H04W 76/14* (2018.02); *H04W 76/27* (2018.02)

(58) Field of Classification Search
CPC .............................. H04W 72/12; H04W 72/14
USPC ......................................................... 370/329
See application file for complete search history.

(56) References Cited

U.S. PATENT DOCUMENTS

| 2007/0243871 A1 | 10/2007 | Chen et al. |
| 2012/0307780 A1 | 12/2012 | Mochizuki |
| 2015/0382324 A1 | 12/2015 | Sheng et al. |
| 2017/0332207 A1 | 11/2017 | Sheng et al. |

(Continued)

FOREIGN PATENT DOCUMENTS

CN    109526255 A    3/2019

OTHER PUBLICATIONS

First Office Action of the European application No. 19834895.5, dated Feb. 15, 2022. 10 pages.

(Continued)

*Primary Examiner* — Angel T Brockman
(74) *Attorney, Agent, or Firm* — Perkins Coie LLP

(57) ABSTRACT

A user equipment and a method of wireless communication of the same are provided. The method includes receiving configuration information of a scheduled mode sidelink resource pool from a base station, the configuration information from the base station comprising at least one of a resource reservation interval, or a length of contiguous sub-channels, and performing sensing in the scheduled mode sidelink resource pool and reporting the sensing result, wherein the sensing result is associated with a set of available resources of the scheduled mode sidelink resource pool.

20 Claims, 5 Drawing Sheets

(56) References Cited

U.S. PATENT DOCUMENTS

2021/0068125 A1* 3/2021 Lin .................. H04W 72/0453

OTHER PUBLICATIONS

Office Action of the Indian application No. 202117000080, dated Jan. 4, 2022. 6 pages with English translation.
First Office Action of the Chinese application No. 202011204787.5, dated Mar. 28, 2022. 15 pages with English translation.
Second Office Action of the Chinese application No. 202011204787.5, dated Jun. 16, 2022. 10 pages with English translation.
Decision of Refusal of the Chinese application No. 202011204787.5, dated Aug. 30, 2022. 9 pages with English translation.
International Search Report in the international application No. PCT/CN2019/095584, dated Oct. 8, 2019.
Written Opinion of the International Search Authority in the international application No. PCT/CN2019/095584, dated Oct. 8, 2019.
Huawei, Hisilicon. "Mode-3 sensing and reporting for resource pool sharing" 3GPP TSG-RAN WG2 Meeting #102, R2-1808314, May 11, 2018 (May 11, 2018), p. 1, lines 10-11, p. 2, line 4, p. 3, lines 1-19.
Huawei, Hisilicon. "Draft CR on mode-3 sensing and reporting", 3GPP TSG-RAN WG2 Meeting #102, R2-1808315, May 11, 2018 (May 11, 2018) p. 5, line 4, p. 19, lines 14-17.
ZTE, OPPO, Sanechips, Fraunhofer HHI, CR on sensing and reporting for mode 3 in Rel-15 eV2X, 3GPP TSG RAN WG1 Meeting #95 R1-1814383 Spokane, USA, Nov. 12-16, 2018.
Huawei, HiSilicon, Draft CR on mode-3 sensing and reporting, 3GPP TSG-RAN WG2 Meeting #103 R2-1811256 Gothenburg, Sweden, Aug. 20-24, 2018.
OPPO, Draft CR on mode-3 sensing and reporting, 3GPP TSG-RAN WG2 Meeting #103 R2-1813178 Gothenburg, Sweden, Aug. 20-24, 2018.
Supplementary European Search Report in the European application No. 19834895.5, dated Jun. 9, 2021.
ZTE: "Consideration on resource pool sharing between UEs using mode 3 and mode 4", 3GPP Draft; R2-1801961, 3rd Generation Partnership Project (3GPP), Mobilecompetence Centre; 650, Route Des Lucioles; F-06921 Sophia-Antipolis Cedex France, vol. RAN WG2, No. Athens, Greece; 20180226-2018030214 Feb. 2018 (Feb. 14, 2018), XP051399053, Section 2.
ZTE: "Discussion on mode-3 UE sensing report for resource pool sharing", 3GPP Draft; R2-1806754 Consideration On Resource Pool Sharing, 3rd Generation Partnership Project (3GPP), Mobile Competence Centre; 650, Route Des Lucioles; F-06921 Sophia-Antipolis Cedex; France vol. RAN WG2, No. Busan, Korea; 20180521-20180525 11 May 2018 (May 11, 2018), XP051464405, Section 3.
First Office Action of the U.S. Appl. No. 16/950,840, dated Jan. 25, 2021.
First Office Action of the U.S. Appl. No. 16/950,840, dated Feb. 1, 2021.
Notice of Allowance of the U.S. Appl. No. 16/950,840, dated Jun. 3, 2021.
Intel Corporation, "On Sidelink Resource Pool Sharing for eNB-Controlled and UE-Autonomous V2V Transmission Modes"[online], 3GPP TSG RAN WG1 #93 R1-1806484, Internet<URL:http://www.3gpp.org/ftp/tsg_ran/WG1_RL1/TSGR1_93/Docs/R1-1806484.zip>, May 21-25, 2018. 5 pages.
First Office Action of the Japanese application No. 2021-500094, dated May 12, 2023. 8 pages with English translation.
ZTE, Sanechips "Resource pool sharing between mode 3 and mode 4" 3GPP TSG RAN WG1 Meeting #92bis R1-1803895, Sanya, China, Apr. 16-20, 2018. 4 pages.
Second Office Action of the Japanese application No. 2021-500094, dated Sep. 8, 2023. 8 pages with English translation.

* cited by examiner

APPARATUS AND METHOD OF WIRELESS COMMUNICATION OF SAME

CROSS REFERENCE TO RELATED APPLICATIONS

This is a continuation of U.S. patent application Ser. No. 16/950,840, filed Nov. 17, 2020, which is a continuation of International Patent Application No. PCT/CN2019/095584 filed on Jul. 11, 2019, which claims priority to U.S. Provisional Application No. 62/696,589 filed on Jul. 11, 2018. The disclosure of these applications is hereby incorporated by reference in their entirety.

DESCRIPTION OF RELATED ART

In current sidelink (SL) technologies designed for cellular vehicle-to-everything (V2X) communication as part of 3rd generation partnership project (3GPP) release 14 long term evolution (LTE) specification, a user equipment (UE) is allowed to operate in one of two pre-defined modes of communication, namely mode 3 and mode 4, for transmitting (Tx) and receiving (Rx) V2X data messages. When the UE is configured to operate in the mode 3, which is also commonly known as a network scheduled resource allocation mode, it is provided with a pool of time and frequency resources via a dedicated radio resource control (RRC) signalling from a serving network base station (BS) for SL communication. Within a provided mode 3 pool, usages of sidelink resources are fully managed by the serving network BS and any specific resources that are required for data transmission are individually assigned to each UE. Hence, the serving network BS has full knowledge and is always in control of all resources and usages are within the allocated mode 3 pool. When a mode 3 UE has V2X data to transmit, it needs to first send a scheduling request along with priority, latency, and periodicity details associated with a data message to the serving network BS requesting for assignment of sidelink resources. Based on the above information, the serving network BS then selects appropriate sidelink resources that would meet required time latency and periodicity within the allocated mode 3 pool and assigns the sidelink resources to the UE for transmitting its data. When the UE is operating under the mode 4, which is also known as a UE autonomous resource selection mode, it is allocated with one or multiple pools of sidelink resources that is common to all V2X UEs by RRC signaling from the serving network BS or by pre-configuration if the UE is not within a signal coverage of the serving network BS. Since the serving network BS configured or pre-configured mode 4 resource pool(s) are shared by all mode 4 UEs and the UEs are to autonomously select their own resources for transmission, there is a risk of more than one UEs selecting the same time and frequency sidelink resource(s) to transmit their data and thus causing Tx collision. In order to minimize this potential risk, it is required that mode 4 UEs are to first perform sensing of sidelink resource usage within mode 4 pools and monitor a resource reservation status before selecting appropriate resources for its own transmission to avoid Tx collision with other UEs.

In a normal operating scenario, mode 3 and mode 4 resource pools on the same carrier can be separated to avoid cross-mode interference as these two modes of operation in terms of resource allocation and selection are fundamentally different from each other as described previously. In some scenarios, however, overlapping mode 3 and mode 4 pools in terms of resource sharing cannot be avoided. In one example scenario, sidelink resources of a network BS configured mode 3 pool could overlap with sidelink resources of a pre-configured mode 4 pool on the same carrier. When there are out-of-coverage mode 4 UEs operating nearby a network serving cell, their transmissions based on UE autonomous selection could heavily interfere with in-coverage mode 3 UEs' operation. In another example scenario, a network BS could choose to configure mode 3 pool resources to fully or partially overlap with mode 4 pools in the same serving cell to minimize amount of resources that is necessary for sidelink operation. As such, in order to support mode 3 and mode 4 resource pool sharing and minimize the cross-mode interference at the same time, it is agreed that serving BS assigned resources can be known and make available to other UEs operating in the overlapped pools by indicating resource reservation information in all mode 3 transmissions so to prevent mode 4 UEs from selecting same resources and causing Tx collisions.

SUMMARY

An object of the present disclosure is to propose an apparatus and a method of wireless communication of same.

In a first aspect of the present disclosure, a user equipment for wireless communication includes a memory, a transceiver, and a processor coupled to the memory and the transceiver. The processor is configured to control the transceiver to receive configuration information of a scheduled mode sidelink resource pool from a base station, wherein the configuration information from the base station comprises at least one of a resource reservation interval, or a length of contiguous sub-channels, perform sensing in the scheduled mode sidelink resource pool and report the sensing result, wherein the sensing result is associated with a set of available resources of the scheduled mode sidelink resource pool.

In a second aspect of the present disclosure, a method of wireless communication of a user equipment includes receiving configuration information of a scheduled mode sidelink resource pool from a base station, wherein the configuration information from the base station comprises at least one of a resource reservation interval, or a length of contiguous sub-channels, and performing sensing in the scheduled mode sidelink resource pool and reporting the sensing result, wherein the sensing result is associated with a set of available resources of the scheduled mode sidelink resource pool.

In a third aspect of the present disclosure, a base station for wireless communication includes a memory, a transceiver, and a processor coupled to the memory and the transceiver. The processor is configured to control the transceiver to send configuration information of a scheduled mode sidelink resource pool to a user equipment, wherein the configuration information comprises at least one of a resource reservation interval, or a length of contiguous sub-channels, and receive a sensing result from the user equipment, wherein the sensing result is associated with a set of available resources of the scheduled mode sidelink resource pool.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Some proposals to 3rd generation partnership project (3GPP) are provided. In the proposals, mode 3 UEs can perform a resource sensing procedure for a certain period of time and then report resource usage findings to the network (e.g., channel busy ratio per measurement period, subframe, or sub-channel), so that a serving base station (BS) could base on these resource usage indications and select resources from subframes or regions of resource pool that are less occupied and assign the selected resources to the mode 3 UE. Although this concept approach may guide the serving BS to select resources from less utilized regions and help to reduce probability of transmitting (Tx) collision to some extent, but it lacks timing information about the usage and reservation status of overlapped resources for the future. Thus, the risk of Tx collision remains high. In an alternative proposal, it is suggested that mode 3 UEs are to report to its serving BS only available future resources that have not been reserved by other UEs based on mode 3 UE's sensing and resource exclusion results. However, it is unclear how a new resource sensing and reporting is triggered and how often the report is sent to the serving BS. In addition, if all available resources within the mode 3 pool are reported, the reporting payload would be very large and causing inefficiency in uplink (UL) resources utilization and unnecessary delay for the resource assignment.

Moreover, it is still not yet defined how a serving BS could avoid assigning resources to mode 3 UEs in overlapped pools that would collide with other UE's transmissions.

An object of the present disclosure is to propose an apparatus and a method of wireless communication of same to solve issues in the related art in user equipment (UE) sensing and reporting of sidelink resources when mode 3 and mode 4 pools are overlapped in sidelink communication.

Figure 1:
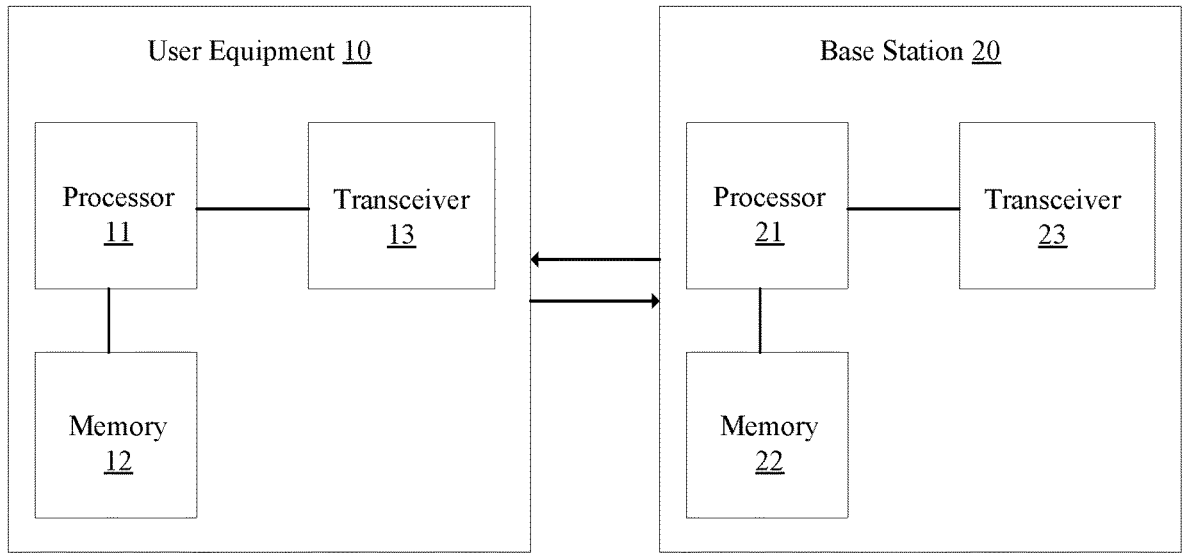
FIG. 1 is a block diagram of a user equipment (UE) and a base station for wireless communication according to an embodiment of the present disclosure.

FIG. 1 illustrates that, in some embodiments, a user equipment (UE) 10 and a base station (BS) 20 for wireless communication according to an embodiment of the present disclosure are provided. The UE 10 may include a processor 11, a memory 12, and a transceiver 13. The base station 20 may include a processor 21, a memory 22, and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface. In addition, some embodiments of the present disclosure relate to V2X communication technology in 3GPP long term evolution (LTE) release 14, 15, and beyond.

In some embodiments, the processor 11 is configured to control the transceiver 13 to receive configuration information of a scheduled mode sidelink resource pool from the base station 20, perform sensing on the scheduled mode sidelink resource pool and report the sensing result, wherein the sensing result is associated with a set of available resources of the scheduled mode sidelink resource pool.

In some embodiments, the processor 11 is requested by the base station 20 to perform sensing on the scheduled mode sidelink resource pool and report the sensing result. In some embodiments, the processor 11 is configured to periodically report the sensing result. In some embodiments, the user equipment 20 is in a radio resource control (RRC) connected mode. In some embodiments, the processor 11 is further configured by the base station 20 or self-triggered to perform sensing on the scheduled mode sidelink resource pool.

In some embodiments, the processor 11 is configured to perform sensing on the scheduled mode sidelink resource pool by retrieving resource reservation information from a physical sidelink control channel (PSCCH) and measuring a reference signal received power (RSRP) level on a physical sidelink shared channel (PSSCH) associated to the PSCCH within a sensing window. In some embodiments, a period of the sensing window ranges between 100 ms and 1000 ms. In some embodiments, the processor 11 is configured to control the transceiver 13 to send, to the base station 20, user equipment assistance information as request for a sidelink scheduling grant from the base station 20.

In some embodiments, the user equipment assistance information includes at least one of a message size, a packet priority, a timing offset value, and a periodicity. In some embodiments, the configuration information from the base station 20 includes at least one of a resource reservation interval, and a length of contiguous sub-channels. In some embodiments, the processor 11 is configured to select the set of available sidelink resources according to the sensing result parameters provided by the base station 20.

In some embodiments, the processor 11 is configured to determine the set of available resources. In some embodiments, the processor 11 is configured to report the determined set of available resources to the base station 20. In some embodiments, the processor 11 is configured to control the transceiver 13 to receive an assignment from the base station 20, and the assignment is associated with selected sidelink resources in the scheduled mode sidelink resource pool. In some embodiments, the scheduled mode resource pool is overlapping with a user equipment autonomous resource selection mode resource pool.

In some embodiments, the processor 21 is configured to control the transceiver to send configuration information of a scheduled mode sidelink resource pool to the user equipment 10, and receive a sensing result from the user equipment 10, wherein the sensing result is associated with a set of available resources of the scheduled mode sidelink resource pool.

In some embodiments, the processor 21 is configured to request the user equipment 10 to perform sensing on the scheduled mode sidelink resource pool and report the sensing result. In some embodiments, the transceiver 23 is configured to periodically receive the sensing result. In some embodiments, the base station 20 has a radio resource control (RRC) connection with the user equipment 10. In some embodiments, the processor 21 is further configured to request the user equipment to perform sensing on the scheduled mode sidelink resource pool by retrieving resource reservation information from a physical sidelink control channel (PSCCH) and measuring a reference signal received power (RSRP) level on a physical sidelink shared channel (PSSCH) associated to the PSCCH within a sensing window.

In some embodiments, a period of the sensing window ranges between 100 ms and 1000 ms. In some embodiments, the processor 21 is configured to control the transceiver 23 to receive, from the user equipment 10, user equipment assistance information as request for a sidelink scheduling grant by the processor 21. In some embodiments, the user equipment assistance information includes at least one of a message size, a packet priority, a timing offset value, and a periodicity. In some embodiments, configuration information from the base station 20 includes at least one of a resource reservation interval, and a length of contiguous sub-channels.

In some embodiments, the processor 21 is configured to control the transceiver 23 to receive a report of a determined set of available resources from the user equipment 10. In some embodiments, the processor 21 is configured to assign, to the user equipment 10, selected sidelink resources in the scheduled mode sidelink resource pool. In some embodiments, the scheduled mode resource pool is overlapping with a user equipment autonomous resource selection mode resource pool.

Figure 2:
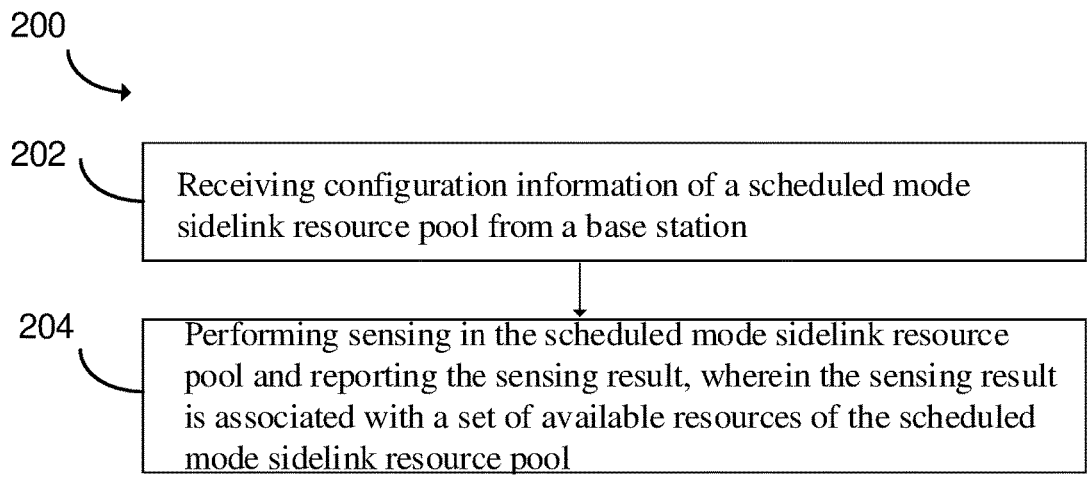
FIG. 2 is a flowchart illustrating a method of wireless communication of a user equipment according to an embodiment of the present disclosure.

FIG. 2 illustrates a method 200 of wireless communication of a user equipment according to an embodiment of the present disclosure. In some embodiments, the method 200 includes: a block 202, receiving configuration information of a scheduled mode sidelink resource pool from a base station, and a block 204, performing sensing on the scheduled mode sidelink resource pool and reporting the sensing result, wherein the sensing result is associated with a set of available resources of the scheduled mode sidelink resource pool.

In some embodiments, the user equipment is requested by the base station to perform sensing on the scheduled mode sidelink resource pool and report the sensing result. In some embodiments, the method further includes periodically reporting the sensing result. In some embodiments, the user equipment is in a radio resource control (RRC) connected mode. In some embodiments, the user equipment is further configured by the base station or self-triggered to perform sensing on the scheduled mode sidelink resource pool.

In some embodiments, perform sensing on the scheduled mode sidelink resource pool is by retrieving resource reservation information from a physical sidelink control channel (PSCCH) and measuring a reference signal received power (RSRP) level on a physical sidelink shared channel (PSSCH) associated to the PSCCH within a sensing window. In some embodiments, a period of the sensing window ranges between 100 ms and 1000 ms. In some embodiments, the method further includes sending, to the base station, user equipment assistance information as request for a sidelink scheduling grant from the base station.

In some embodiments, the user equipment assistance information includes at least one of a message size, a packet priority, a timing offset value, and a periodicity. In some embodiments, the configuration information from the base station includes at least one of a resource reservation interval, and a length of contiguous sub-channels.

In some embodiments, the method further includes selecting the set of available sidelink resources according to the sensing result parameters provided by the base station. In some embodiments, the method further includes determining the set of available resources. In some embodiments, the method further includes reporting the determined set of available resources to the base station. In some embodiments, the method further includes receiving an assignment from the base station, and the assignment is associated with selected sidelink resources in the scheduled mode sidelink resource pool. In some embodiments, the scheduled mode resource pool is overlapping with a user equipment autonomous resource selection mode resource pool.

Figure 3:
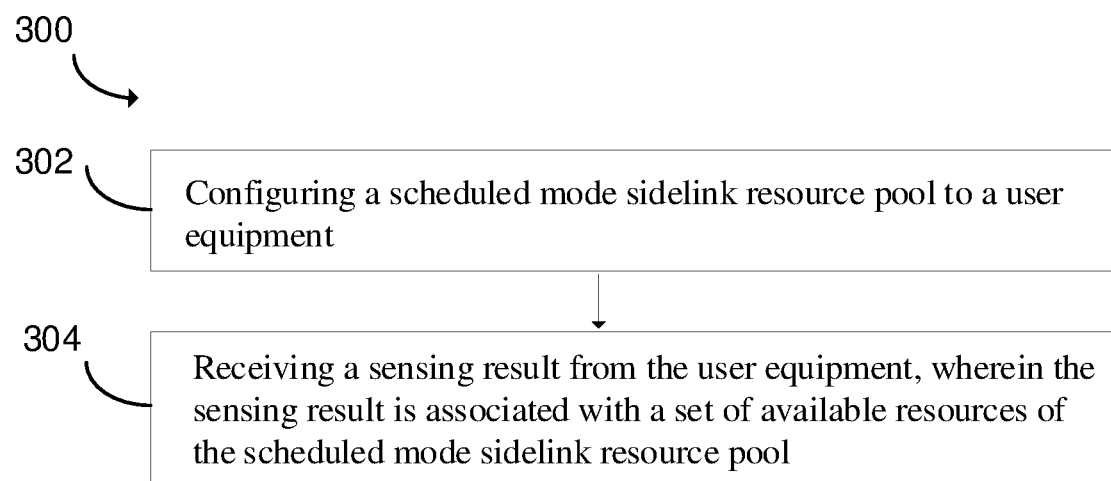
FIG. 3 is a flowchart illustrating a method of wireless communication of a base station according to an embodiment of the present disclosure.

FIG. 3 illustrates a method 300 of wireless communication of a base station according to an embodiment of the present disclosure. In some embodiments, the method 300 includes: a block 302, sending configuration information of a scheduled mode sidelink resource pool to a user equipment, and a block 304, receiving a sensing result from the user equipment, wherein the sensing result is associated with a set of available resources of the scheduled mode sidelink resource pool.

In some embodiments, the method further includes requesting the user equipment to perform sensing on the scheduled mode sidelink resource pool and report the sensing result. In some embodiments, the method further includes periodically receiving the sensing result. In some embodiments, the base station has a radio resource control (RRC) connection with the user equipment.

In some embodiments, the method further includes requesting the user equipment to perform sensing on the scheduled mode sidelink resource pool by retrieving resource reservation information from a physical sidelink control channel (PSCCH) and measuring a reference signal received power (RSRP) level on a physical sidelink shared channel (PSSCH) associated to the PSCCH within a sensing window.

In some embodiments, a period of the sensing window ranges between 100 ms and 1000 ms. In some embodiments, the method further includes receiving, from the user equipment, user equipment assistance information as request for a sidelink scheduling grant by the base station. In some embodiments, the user equipment assistance information includes at least one of a message size, a packet priority, a timing offset value, and a periodicity.

In some embodiments, configuration information from the base station includes at least one of a resource reservation interval, and a length of contiguous sub-channels. In some embodiments, the method further includes receiving a report of a determined set of available resources from the user equipment. In some embodiments, the method further includes assigning, to the user equipment, selected sidelink resources in the scheduled mode sidelink resource pool. In some embodiments, the scheduled mode resource pool is overlapping with a user equipment autonomous resource selection mode resource pool.

Figure 4:
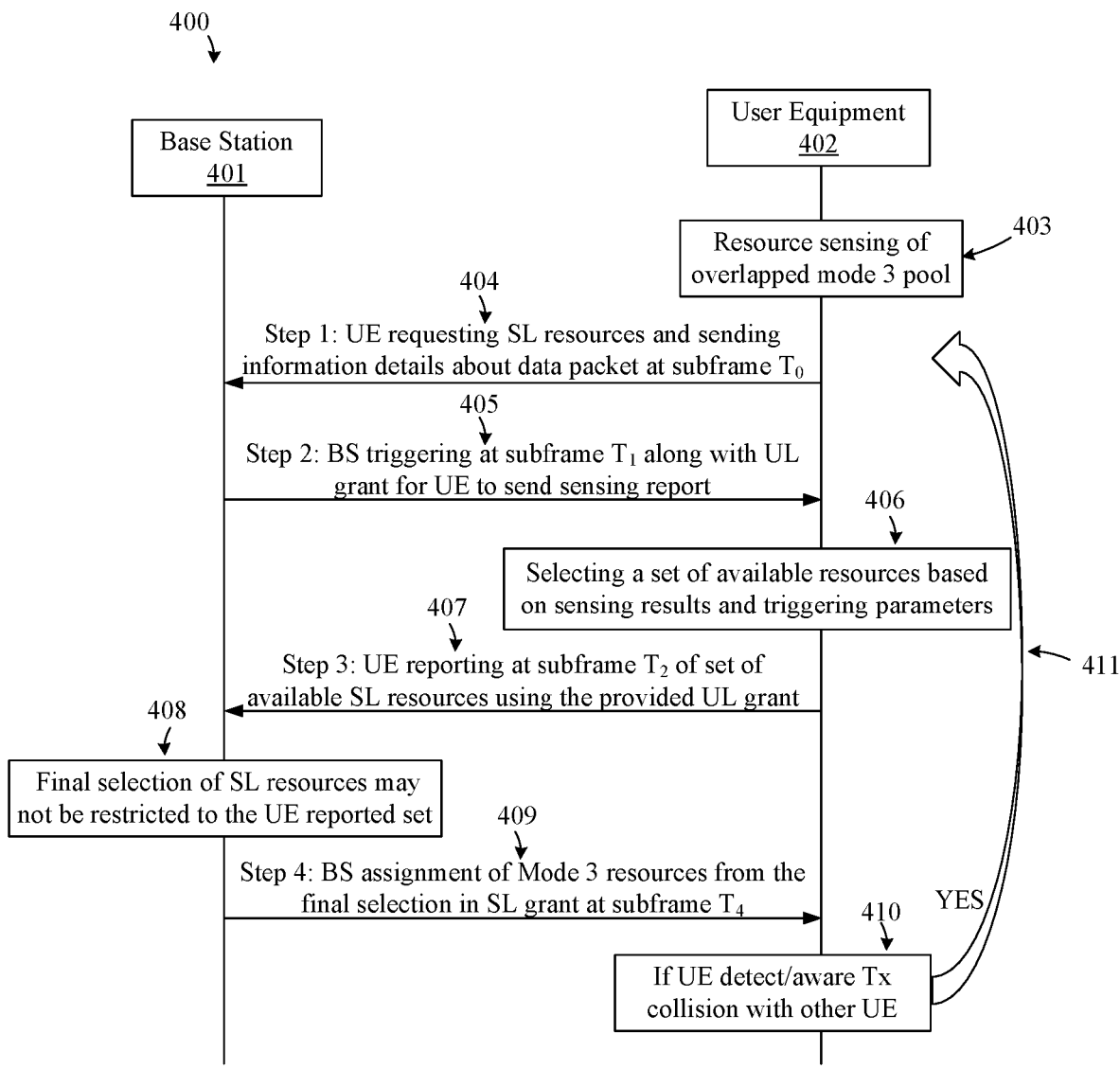
FIG. 4 is a schematic diagram of an exemplary illustration of a UE sensing and reporting sequence according to an embodiment of the present disclosure.
Figure 5:
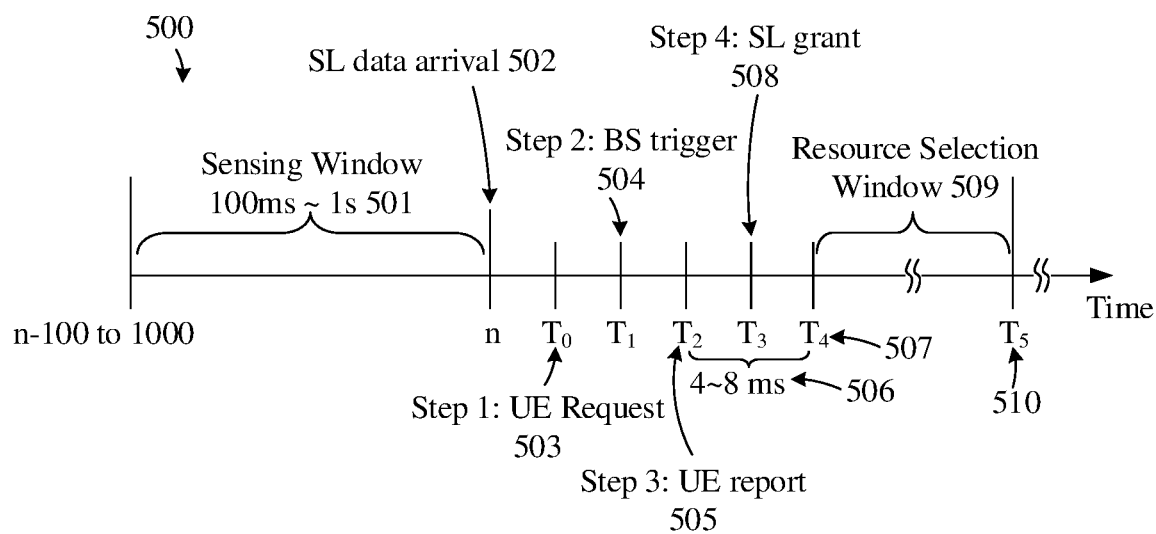
FIG. 5 is a schematic diagram of an exemplary illustration of a time line for UE sensing and reporting according to an embodiment of the present disclosure.

FIG. 4 illustrates an exemplary illustration of a UE sensing and reporting sequence according to an embodiment of the present disclosure. FIG. 5 illustrates an exemplary illustration of a time line for UE sensing and reporting according to an embodiment of the present disclosure. In some embodiments, FIGS. 4 and 5 illustrate that, for a proposed method of BS scheduling of sidelink resources to avoid Tx collision when resources are shared by both mode 3 and mode 4 pools and potentially being used or already reserved by mode 4 UE(s), a detailed sensing and reporting procedure sequence for mode 3 UE and associated timeline diagrams are exemplarily illustrated in FIGS. 4 and 5, respectively. In reference to an operation 400 and an operation 500, a serving network BS 401 may have one or multiple UEs having an RRC connection to a cellular network for V2X services. For an RRC connected UE 402 that has been assigned to operate in a mode 3 (e.g., a network scheduled resource allocation mode) and configured with a mode 3 resource pool, it may be further instructed by the serving network BS 401 or UE self-triggered to perform a sensing operation continuously on the configured mode 3 pool at an operation 403.

BS instructed: The serving network BS 401 may trigger the UE 402 to perform sensing on the configured mode 3 resource pool at the same time when the pool is being configured to the UE 402. And such a sensing trigger is only necessary when the configured mode 3 pool has partial or fully overlapping resources with at least one mode 4 pool. If triggered, the serving network BS 401 may further indicate a region of overlapped resources that the UE 402 needs to perform sensing. If this is not indicated, the sensing needs to be done on all mode 3 resources that are overlapping with other mode 4 pool(s).

UE self-triggered: If the serving network BS 401 does not trigger resource sensing, the UE 402 may base on its knowledge and self-detection of its configured mode 3 pool is being partially or fully overlapped with at least one mode 4 resource pool which could be an in-coverage network configured pool or a pre-configured pool for out-of-coverage operation on the same carrier. Furthermore, the sensing is only necessary to be performed on mode 3 resources that are overlapping with other mode 4 pool(s).

Once triggered, the sensing of overlapped mode 3 resources is performed by decoding PSCCH's received within a sensing window and retrieving information relating to reservation of future resources. At the same time, the UE 402 also needs to measure reference signal received power (RSRP) level on PSSCH associated to each received and decoded PSCCH (namely PSSCH-RSRP). In order to obtain sufficient information on reservation of future resources, the sensing needs to be performed over a period of window of at least 100 ms to 1 s (1000 ms) as illustrated by an operation 501 in FIG. 5.

Upon arrival of sidelink (SL) data packet(s) from UE's upper layer at subframe timing n in a step 1 502, the UE 402 as a step 1 404 sends a request to the serving network BS 401 for sidelink scheduling grant, along with at least one of message size, packet priority (which is related to latency requirement of the packet), a timing offset to the next packet arrival, and a periodicity relating to the sidelink data as part of UE assistance information at subframe $T_0$ at an operation 503.

As a step 2 405, based on a received UE request and information relating to the SL data packet, the serving network BS 401 at subframe timing $T_1$ at a step 2 504 may trigger the UE 402 to report a set of available mode 3 resources that are overlapping with a mode 4 pool and at the same time provide an UL grant for the UE to provide at subframe timing $T_2$ in a step 3 505 of such report. The BS triggering could be performed by a media access control-control element (MAC-CE) or a new downlink control information (DCI). When the serving network BS 401 triggers the UE 402 reporting, it includes at least one of the following information.

Activation and/or deactivation: The serving network BS 401 may activate the UE 402 to report a set of available sidelink resources from the configured mode 3 pool if it is determined that the pool and/or a certain resource zone/region of the pool overlaps with other mode 4 pool(s). The serving network BS 401 may deactivate this UE reporting if it is determined that the operating resource zone/region of the configured mode 3 pool no longer overlaps with other mode 4 pool(s) due to change of UE geographical location.

Resource reservation interval and/or counter: When this parameter is set to a non-zero value, the UE 402 periodically reports an updated set of available resources based on UE's latest sensing results when the resource reservation interval and/or counter reaches zero. Once the counter reaches zero, the UE 402 resets it back to the non-zero value which is given by the serving network BS 401. Furthermore, the UE 402 can be triggered by the serving network BS 401 to report an updated set of available resources at any time before an expiry of reservation interval and/or counter based on UE's latest reporting of a geographical location. In this case, the BS triggering of such a report will include a new resource zone of the mode 3 pool for which the UE report needs to be confined to. When this parameter is not set or it is set to a zero value, the UE 402 needs to report a set of available resources just once for one-shot SL transmission (i.e., no periodic reporting).

Time gap between $T_2$ and $T_4$ at an operation 506: As described earlier, subframe timing $T_2$ in the step 3 505 is the subframe where the UE 402 needs to report a set of available resources to the serving network BS 401. Once the UE report has been provided, subframe timing $T_4$ at an operation 507 is then the earliest subframe timing where the UE 402 can possibly start transmitting its SL data packet. By taking into account of UE preparation time for SL transmission, $T_4$ at the operation 507 is at least 4 subframes (4 ms) after the UE reporting timing $T_2$ in the step 3 505 or after the SL grant timing $T_3$ in a step 4 508. If the time gap between the UE reporting and SL grant are also taken into account, then additional 1 ms to 4 ms could be added to the 4 subframes. As such, the time gap between $T_2$ and $T_4$ at the operation 506 ranges between 4 ms and 8 ms.

Resource zone: The serving network BS 401 may choose to set a particular zone of SL resources within the configured mode 3 pool that the selection of available resources is restricted to. This could be due to a UE reported geographical location and may further restrict the time period for which the UE 402 selects the set of available resources. If this parameter is not set or it is set to zero, which may be due to the UE 402 is not configured to periodically report its geographical location, then the set of available resources are selected from the areas/regions of resources that are shared between the configured mode 3 pool and a mode 4 pool.

Length of contiguous sub-channels ($L_{subCH}$): Based on UE's indication of a message size, the serving network BS 401 may set a length of a number of sub-channels contiguous in the frequency domain for UE's selection of the set of available resources.

Target size of reporting resource set: For the set of available resources that the UE 402 needs to report, target size of the reporting set could be limited by the serving network BS 401 to 3, 4, 5, 6, . . . , or 10 for reducing UE report payload size, minimizing UE reporting delay and as well as improving decoding reliability for the serving network BS 401. As an example of UE report payload size saving for a 20 MHz SL carrier bandwidth with 25 sub-channels and 80 ms in the resource selection window, the payload size would be 25×80=2000 bits if the UE report is represented using a bitmap string to indicate every possible available resource within the selection window, and only (5+10)×10=150 bits are needed to represent a sub-set of 10 available resources to the serving network BS 401 if an indexing method is used for the reporting.

Alternatively, the target set size could be based on 20% of total number of resources within the resource zone (if provided to the UE 402) and within a resource selection window $T_4$-$T_5$ at an operation 509, where $T_5$ at an operation 510 is the latest subframe timing by which the SL data packet needs to be transmitted in order to satisfy its latency requirement.

Once the reporting of available resources is triggered by the serving network BS 401, the UE 402 needs to base on its sensing results obtained over the sensing window at an operation 501 and triggering parameters received in the step 2 405 to perform selection of resources to be reported to the serving network BS 401 at the operation 406. In details, the UE 402 needs to perform the following functions to determine the set of available resources.

Based on resource reservation information and associated PSSCH-RSRP measurements obtained from the outcome of resource sensing at the operation 403, the UE 402 first excludes any sub-channel within the resource selection window at the operation 509 that has been reserved by other UE with a measured PSSCH-RSRP level above a configured threshold.

Then from the remaining mode 3 resources within the resource selection window at the operation 509 and overlap with other mode 4 pool(s), the UE 402 randomly selects with equal probability a number of resources equal to the target reporting set size and satisfy the following criteria, if they are indicated by the serving network BS 401 in the step 2 405. Further confined within the indicated resource zone is provided. Length of contiguous sub-channels ($L_{subCH}$) is provided.

Based on the selected resources, the UE 402 needs to compile a report containing the set of selected resources from an operation 406 to be feedback to the network BS in a step 3 407 at subframe timing $T_2$ in the step 3 505 using the provided UL grant. The compilation of the set of selected resources contains only the starting sub-channel index for each selected resource when the length of contiguous sub-channels ($L_{subCH}$) is more than one to save reporting payload size. Indexing of the starting sub-channel ($n_{subCH}^{start}$) can be done by using 5 bits to indicate its frequency position and 10 bits to indicate its time position within the resource selection window at the operation 509. In total, 15 bits would be sufficient to represent any sub-channel within a 20 MHz carrier and a resource selection window of 1024 ms.

At the serving network BS 401 at an operation 408, the final selection of SL mode 3 resource(s) to be assigned to the UE 402 is not necessarily restricted by the UE reported set from the step 3 407, since the configured mode 3 (network scheduled resource allocation mode, or scheduled mode for short) resource pool may not be fully overlapped with other mode 4 pool(s). Therefore, the final selection of SL resource(s) may still be chosen by the serving network BS 401 from a non-overlapping region of the mode 3 resource pool. In a step 4 409, the serving network BS 401 provides the final selection of Mode 3 resource(s) in a sidelink grant to the UE at subframe $T_3$ in the step 508, for UE transmission of its data packet between $T_4$ and $T_5$ at the operation 509.

If the UE 402 detects after the assignment of SL resources from the serving network BS 401 that the assigned resource(s) will collide with other UE's SL transmission (e.g., from a mode 4 UE) at an operation 410, the UE 402 may repeat the entire UE sensing and reporting procedure again from the step 1 404 with its latest sensing results at an operation 411.

As used herein, the term "scheduled mode" is equivalent to the term "network scheduled resource allocation mode" or "Mode 3." The term "sensing" is equivalent to the term "sensing measurement." The term "requested" is equivalent to the term "triggered," "instructed," or "indicated."

Figure 6:
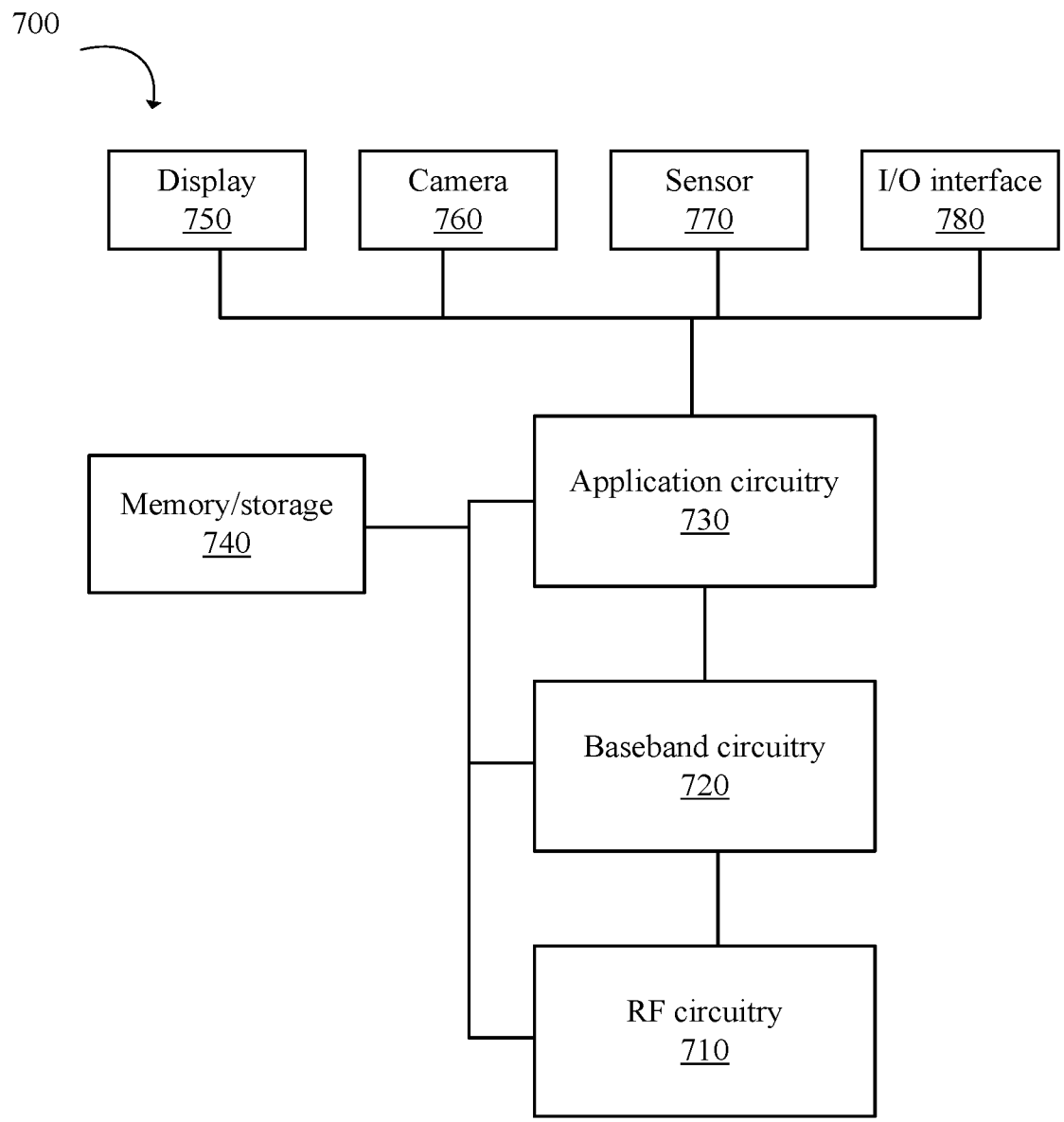
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an application specific integrated circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In summary, some embodiments of the present disclosure provide the following five aspects.

Aspect 1: Resource sensing which includes PSCCH decoding and PSSCH-RSRP measurement of mode 3 resource can be triggered either by BS indication or UE self-detection. If triggered by BS indication, it may further include region(s) of overlapped resources that the UE needs to perform sensing. If UE self-triggered, the sensing operation is performed only on mode 3 resources that are overlapping with other mode 4 pool(s).

Aspect 2: BS triggering and stopping for the UE to report a set of available resources could be performed by a MAC-CE or DCI. The triggering includes at least one of the following information. The following information includes activation and/or deactivation, resource reservation interval and/or counter, time gap between UE report timing and beginning of resource selection window, resource zone, length of contiguous sub-channels, and/or target size of reporting resource set.

Aspect 3: UE selection of available resources within a resource selection window is performed based on resource sensing results by first excluding any resources that have been reserved by other UEs and then selecting a set of available resources that satisfy all criteria set by the BS.

Aspect 4: Compilation of UE report includes only a sub-set of total available resources, where the sub-set size could be limited to max 10 resources or 20% of total available resources. And the reporting of each of the selected resource includes only the starting sub-channel position, which can be represented by a combination of two indices. The frequency location of a starting sub-channel can be represented by max of 5 bits and the time location can be represented by max of 10 bits.

Aspect 5: UE autonomous restart and/or reinitiate the whole sensing and reporting procedure to avoid transmission collision when it is detected.

Some embodiments of the present disclosure aim to solve the above described issues in UE sensing and reporting of sidelink resources when mode 3 and mode 4 pools are overlapped in sidelink communication. Some embodiments of the new sensing and reporting method of sidelink resources have at least one of following benefits.

1. Selection and reporting of only relevant resources: No redundant information and this leads to better UL resource utilization.

2. Only a sub-set of all total available resources are reported: Better efficiency in UL resource usage from smaller payload, higher reliability, and shorter reporting delay.

3. Faster reporting by providing BS trigger and reporting grant at the same time: less delay without the need of additional UL scheduling request from the UE.

4. UE autonomous decision in sensing and collision avoidance: Less triggering and signaling, and higher transmission reliability.

The embodiment of the present disclosure is a combination of techniques/processes that can be adopted in 3GPP specification to create an end product. The embodiment of the present disclosure has at least one of following benefits.

1. More reliable in UE reporting data transmission for LTE-sidelink communication through fixed transmission pattern and/or frequency hopping.

2. Better utilization of UL resources, and higher reliability, and less delay of UE report through reporting of only relevant information and/or only a sub-set of total available resources need to be selected and reported.

3. Faster reporting through joint BS trigger and providing UL grant at the same time.

4. Better V2X communication performance and reliability through UE autonomous and active transmission collision avoidance.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment for wireless communication, comprising:
 a memory;
 a transceiver; and
 a processor coupled to the memory and the transceiver;
 wherein the processor is configured to:
  control the transceiver to receive configuration information of a scheduled mode sidelink resource pool from a base station;
  perform sensing in the scheduled mode sidelink resource pool,
 characterized in that the processor is further configured to:
  control the transceiver to obtain a resource reservation interval and a length of contiguous sub-channels $L_{subCH}$;
  determine a set of available resources of the scheduled mode sidelink resource pool based on the length of contiguous sub-channels $L_{subCH}$; and
  control the transceiver to report a sensing result to the base station based on the resource reservation interval, wherein the sensing result is associated with the determined set of available resources.

2. The user equipment of claim 1, wherein the processor is configured by the base station to perform sensing in the scheduled mode sidelink resource pool and to control the transceiver to report the sensing result.

3. The user equipment of claim 1, wherein the processor is configured to control the transceiver to periodically report the sensing result.

4. The user equipment of claim 1, wherein the user equipment is radio resource control (RRC) connected.

5. The user equipment of claim 1, wherein the configuration information from the base station comprises at least one of a resource reservation interval, or a length of contiguous sub-channels $L_{subCH}$.

6. The user equipment of claim 1, wherein the processor is configured to report the determined set of available resources to the base station.

7. A method of wireless communication of a user equipment, comprising:

receiving configuration information of a scheduled mode sidelink resource pool from a base station;
performing sensing in the scheduled mode sidelink resource pool;
characterized in that the method further comprises:
obtaining a resource reservation interval and a length of contiguous sub-channels $L_{subCH}$;
determining a set of available resources of the scheduled mode sidelink resource pool based on the length of contiguous sub-channels $L_{subCH}$; and
reporting a sensing result to the base station based on the resource reservation interval, wherein the sensing result is associated with the determined set of available resources.

8. The method of claim 7, wherein the user equipment is configured by the base station to perform sensing in the scheduled mode sidelink resource pool and report the sensing result.

9. The method of claim 7, further comprising periodically reporting the sensing result.

10. The method of claim 7, wherein the user equipment is radio resource control (RRC) connected.

11. The method of claim 7, wherein the configuration information from the base station comprises at least one of a resource reservation interval, or a length of contiguous sub-channels $L_{subCH}$.

12. The method of claim 7, further comprising reporting the determined set of available resources to the base station.

13. A base station for wireless communication, comprising:
a memory;
a transceiver; and
a processor coupled to the memory and the transceiver;
wherein the processor is configured to:
control the transceiver to send configuration information of a scheduled mode sidelink resource pool to a user equipment; and
characterized in that the processor is further configured to:
control the transceiver to send a resource reservation interval and a length of contiguous sub-channels $L_{subCH}$ to the user equipment;
receive a sensing result from the user equipment based on the resource reservation interval, wherein the sensing result is associated with a set of available resources of the scheduled mode sidelink resource pool determined based on the length of contiguous sub-channels $L_{subCH}$.

14. The base station of claim 13, wherein the processor is configured to configure the user equipment to perform sensing in the scheduled mode sidelink resource pool and report the sensing result.

15. The base station of claim 13, wherein the processor is configured to control the transceiver to periodically receive the sensing result.

16. The base station of claim 13, wherein the base station has a radio resource control (RRC) connection with the user equipment.

17. The base station of claim 13, wherein the configuration information comprises at least one of a resource reservation interval, or a length of contiguous sub-channels $L_{subCH}$.

18. The base station of claim 13, wherein the processor is configured to control the transceiver to receive a report of a determined set of available resources from the user equipment.

19. The user equipment of claim 1, wherein the scheduled mode resource pool is overlapping with a user equipment autonomous resource selection mode resource pool.

20. The method of claim 7, wherein the scheduled mode resource pool is overlapping with a user equipment autonomous resource selection mode resource pool.

* * * * *